(12) United States Patent
Hayasaka (10) Patent No.: US 8,417,079 B2
(45) Date of Patent: Apr. 9, 2013

(54) METHOD OF PRODUCING A FERRULE WITH AN OPTICAL FIBER

(75) Inventor: Daisuke Hayasaka, Yonezawa (JP)

(73) Assignee: Yonezawa Electric Wire Co., Ltd., Yamagata-Ken (JP)

( * ) Notice: Subject to any disclaimer, the term of this patent is extended or adjusted under 35 U.S.C. 154(b) by 0 days.

(21) Appl. No.: 12/650,922

(22) Filed: Dec. 31, 2009

(65) Prior Publication Data

US 2010/0101699 A1    Apr. 29, 2010

Related U.S. Application Data

(62) Division of application No. 11/443,426, filed on May 30, 2006, now Pat. No. 7,756,370.

(30) Foreign Application Priority Data

May 31, 2005    (JP) .................................. 2005-159599

(51) Int. Cl.
    *G02B 6/26*    (2006.01)
    *G02B 6/42*    (2006.01)

(52) U.S. Cl.
    USPC .............................................. 385/51; 385/15

(58) Field of Classification Search ............. 385/15, 385/51, 84
    See application file for complete search history.

(56) References Cited

U.S. PATENT DOCUMENTS

| | | | | |
|---|---|---|---|---|
| 5,615,291 A * | 3/1997 | Hayakawa et al. | ............. | 385/84 |
| 5,778,126 A * | 7/1998 | Saitoh | ............. | 385/84 |
| 6,281,476 B1 * | 8/2001 | Voizey | ............. | 219/386 |
| 6,282,349 B1 * | 8/2001 | Griffin | ............. | 385/81 |

FOREIGN PATENT DOCUMENTS

| | | |
|---|---|---|
| JP | 60-149015 | 8/1985 |
| JP | 61-221712 | 10/1986 |
| JP | 63-96513 | 6/1988 |
| JP | 64-6609 | 1/1989 |
| JP | 10-307233 | 11/1998 |
| JP | 2000-047057 | 2/2000 |
| JP | 2000-147320 | 5/2000 |
| JP | 2001-004875 | 1/2001 |
| JP | 2003-066273 | 3/2003 |
| JP | 2003-121692 | 4/2003 |
| JP | 2003-307649 | 10/2003 |
| JP | 2004-191915 | 7/2004 |
| JP | 2005-189805 | 7/2005 |

* cited by examiner

*Primary Examiner* — Ryan Lepisto
*Assistant Examiner* — Erin Chiem
(74) *Attorney, Agent, or Firm* — Hoffmann & Baron, LLP (57) ABSTRACT

In accordance with a method of producing a ferrule with an optical fiber, a reinforcing pipe is adhered to a single-core fiber to form an adhesive portion that protrudes and tapers from a pipe end surface portion of the reinforcing pipe toward a front end of the single-core fiber. The single-core fiber includes an optical fiber and a coating. The coating is stripped from the front end of the single-core fiber to provide an exposed optical fiber portion and a coated optical fiber portion. The coated optical fiber portion has a coating end surface portion. The single-core-fiber is inserted in a ferrule provided with a first tapered hole and a second tapered hole until the coating end surface portion abuts against the first tapered hole and until the pipe end surface portion abuts against the second tapered hole. Thereafter, the single-core fiber is secured in the ferrule.

16 Claims, 7 Drawing Sheets

METHOD OF PRODUCING A FERRULE WITH AN OPTICAL FIBER

CROSS-REFERENCE TO RELATED APPLICATIONS

This application is a divisional of U.S. patent application Ser. No. 11/443,426, filed on May 30, 2006, which claims priority from Japanese Patent Application No. 2005-159599, filed on May 31, 2005, the disclosures of which are incorporated herein in their entireties by reference.

BACKGROUND OF THE INVENTION

1. Field of the Invention

The present invention relates to a method of producing a ferrule with an optical fiber.

2. Description of the Related Art

Heretofore, optical connectors have been used as one means for optically connecting optical fibers. Generally, an optical connector is formed by a process in which the front part of a resin coating of a coated optical fiber is peeled, and then, the thus exposed bare optical fiber is inserted and fixed in an optical-fiber-insertion hole (see e.g., Japanese Unexamined Patent Application, First Publication No. 2000-147320).

Figure 5:
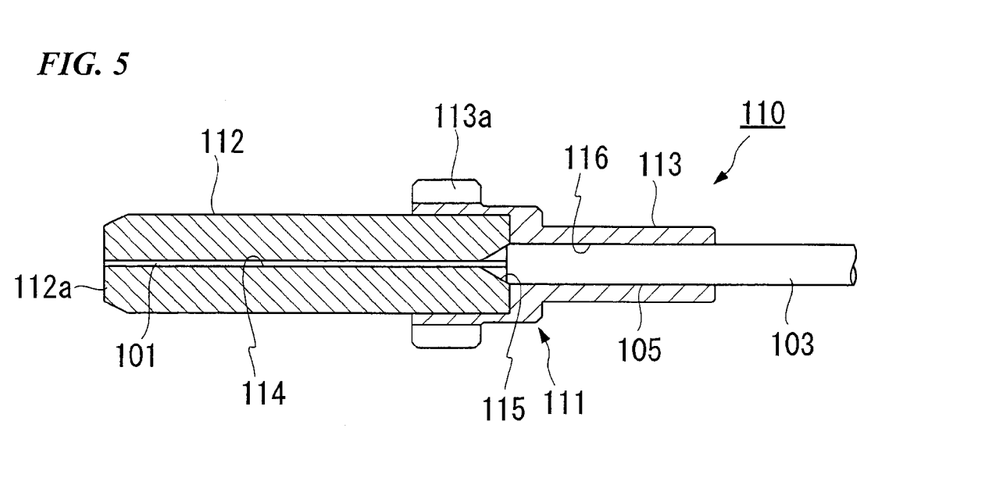
FIG. 5 is a longitudinal cross sectional view illustrating a first example of a conventional ferrule with an optical fiber.
Figure 6:
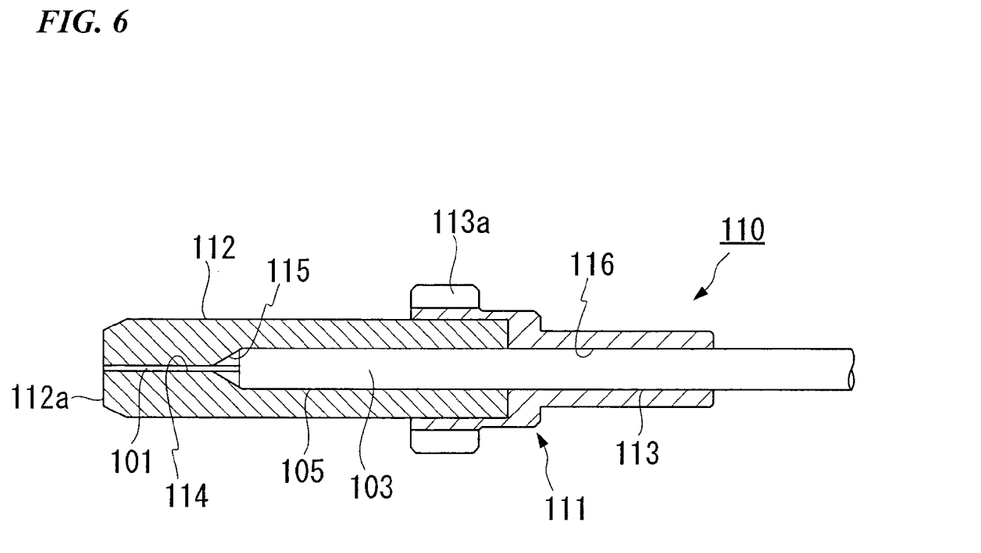
FIG. 6 is a longitudinal cross sectional view illustrating a second example of a conventional ferrule with an optical fiber.
Figure 7:
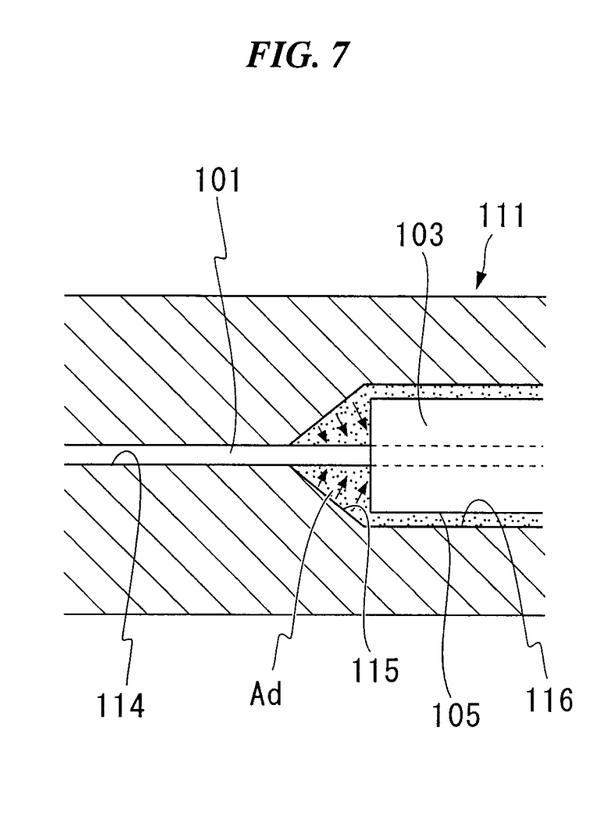
FIG. 7 is a longitudinal cross sectional view for explaining the influence of shrinkage of adhesive in the vicinity of a tapered hole of a conventional ferrule with an optical fiber.

FIGS. 5 and 6 are longitudinal cross sectional views illustrating examples of a conventional ferrule with an optical fiber 110.

Each of these ferrules with an optical fiber 110 is structured such that a bare optical fiber 101 which is exposed at a front end side of a coated optical fiber 103 is inserted in an optical-fiber-insertion hole 114 of a ferrule 111 and then fixed by providing adhesive therein. The coated optical fiber 103 is formed from the bare optical fiber 101 and a resin coating provided thereupon.

The ferrule 111 is structured such that a capillary 112 made of zirconia or the like is fixed to a front end side of a ferrule body 113 provided with a flange 113a. The capillary 112 is provided with a connection-end face 112a and an optical-fiber-insertion hole 114 which is in the connection-end face 112a and in which the bare optical fiber 101 is inserted and positioned in place. Further, the ferrule body 113 is formed with a coated-fiber-insertion hole 116 in which the coated optical fiber 103 is inserted and housed.

In the ferrule 111 of FIG. 5, the coated-fiber-insertion hole 116 is provided within the range of the ferule body 113, whereas in the ferrule of FIG. 6, the coated-fiber-insertion hole 116 is provided within a range from the ferrule body 113 to a rear end side of the capillary 112. The coated-fiber-insertion hole 116 is larger in diameter than the optical-fiber-insertion hole 114. A tapered hole 115 is provided between the optical-fiber-insertion hole 114 and the coated-fiber-insertion hole 116, which are caused to communicate thereby.

However, in the case in which a front end portion of the coated optical fiber 103 is inserted and fixed in the ferrule 111 as shown in FIGS. 5 and 6, because the difference in shrinkage ratio between the diameter of the coated-fiber-insertion hole 116 and the diameter of the optical-fiber-insertion hole 114 is substantial, then a considerable amount of adhesive Ad inevitably presents in the tapered hole 115. As a result, because of shrinkage of the adhesive occurring during a curing operation or due to changes in temperature and because of inclusion of bubbles in the adhesive, substantial stress acts on the part of the optical-fiber-insertion hole 114 in the vicinity of the tapered hole 115, thereby resulting in deterioration of characteristics of the optical fiber.

Figure 8A:
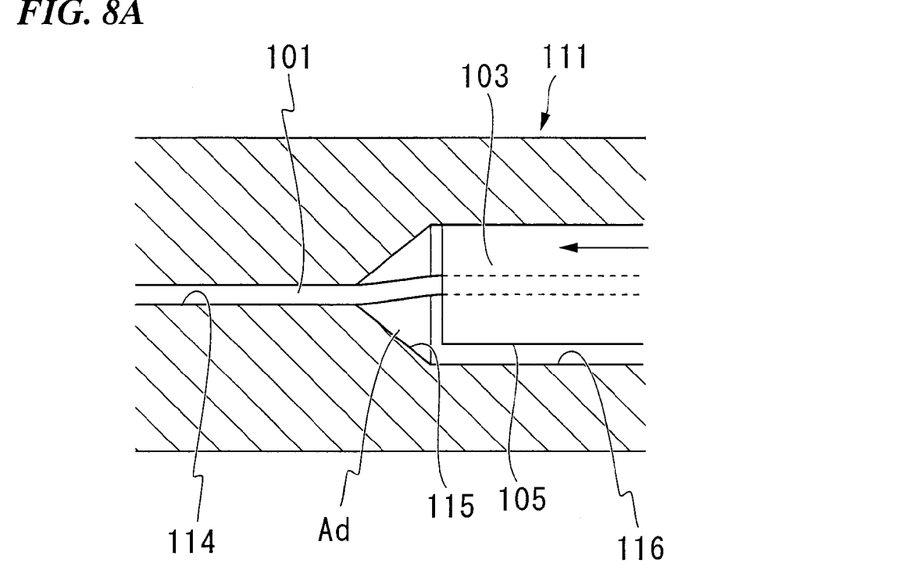
Figure 8B:
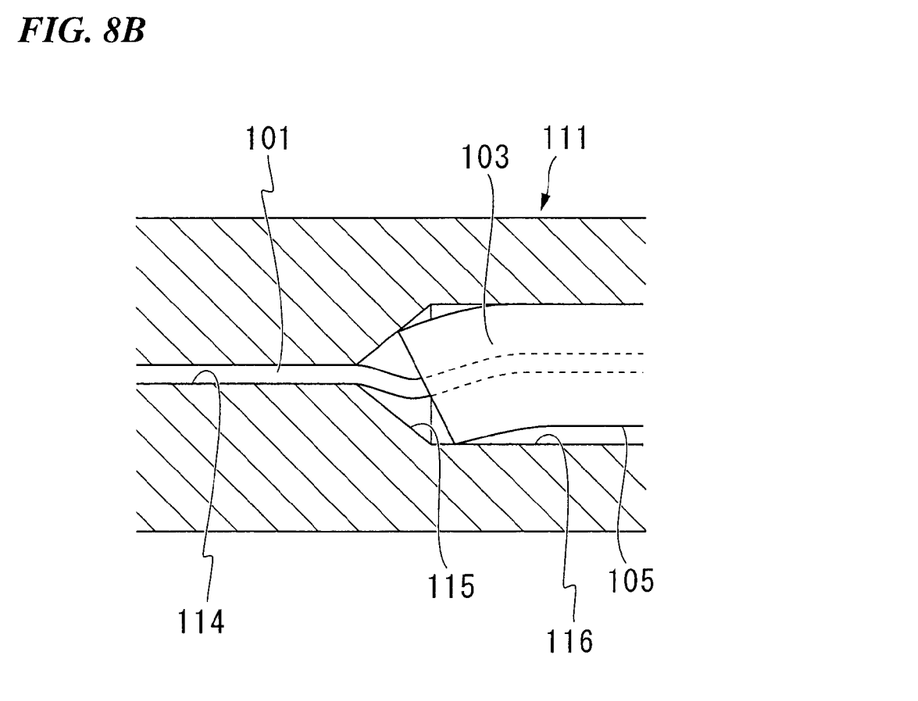
FIG. 8B is a view illustrating an appearance of an optical fiber bent due to abutting of an end of a resin coating of the optical fiber against a tapered hole.

Further, the diameter of the coated optical fiber 103 is, for example, approximately 0.9 mm and thus it is difficult to improve positioning accuracy of the coated-fiber-insertion hole 116 with respect to an outer periphery of the coated optical fiber 103. Therefore, there is generally a certain level of clearance (e.g., approximately 0.1 mm or more, as a difference between inside and outside diameters) between the outer periphery of the coated optical fiber 103 and an inner surface of the coated-fiber-insertion hole 116. As shown in FIG. 8A, when the optical fiber is inserted in the ferrule, a center line of the coated optical fiber 103 is likely to deviate from a center line of the coated-fiber-insertion hole 116 such that the coated optical fiber bends or becomes imbalanced due to friction or the like between the resin coating 105 and the inner surface of the coated-fiber-insertion hole 116. Alternatively, as shown in FIG. 8B, a front end of the resin coating 105 is likely to abut against the tapered hole 115 in a slanted (biased) manner such that stress locally acts on the resin coating. There is the fear that further deterioration of characteristics of the optical fiber may result due to damaging bends of the bare optical fiber 101. Incidentally, in FIGS. 8A and 8B, the adhesive between the optical fiber and the inner surface of the hole is not illustrated.

As described above, when the end of the coating of the coated optical fiber abuts against the inner surface of the tapered hole, or conversely when a gap which is provided between the end of the coating and the inner surface of the tapered hole is filled with adhesive, there is the fear that external forces may be generated and applied unevenly to the bare optical fiber due to reactive forces from the inner surface of the tapered hole, shrinkage of the adhesive or the like. It is therefore difficult to produce or assemble a high-performance ferrule with an optical fiber.

SUMMARY OF THE INVENTION

The present invention has been made in consideration of the above circumstances. An object of the invention is to provide a method of producing a ferrule with an optical fiber in which it is possible to control worsening of characteristics when the ferrule is secured to a front end of a coated optical fiber.

In accordance with an embodiment of the invention, there is provided a method of producing a ferrule with an optical fiber. A reinforcing pipe is adhered to a single-core fiber to form an adhesive portion that protrudes and tapers from a pipe end surface portion of the reinforcing pipe toward a front end of the single-core fiber. The single-core fiber includes an optical fiber and a coating. The coating is stripped from the front end of the single-core fiber to provide an exposed optical fiber portion and a coated optical fiber portion. The coated optical fiber portion has a coating end surface portion. The single-core-fiber is inserted in a ferrule provided with a first tapered hole and a second tapered hole until the coating end surface portion abuts against the first tapered hole and until the pipe end surface portion abuts against the second tapered hole. Thereafter, the single-core fiber is secured in the ferrule.

In accordance with an aspect of the invention, the reinforcing pipe is adhered by inserting the single-core-fiber in the reinforcing pipe. The single-core-fiber and the reinforcing pipe are glued using an adhesive. The front end of the single-core fiber is exposed from the pipe end surface portion and the adhesive is cured and formed into the adhesive portion.

In accordance with another aspect of the invention, the adhesive portion is cured and formed to include a taper angle about a taper angle of the second hole.

In accordance with yet another aspect of the invention, a peripheral edge of the coating end surface portion is deformed until the coating end surface portion touches inner surfaces of the first hole when the single-core-fiber is inserted in the ferrule.

In accordance with a further aspect of the invention, to secure the single-core fiber in the ferrule an adhesive is introduced in the first hole of the ferrule. A first portion of the adhesive is displaced from the first hole by the deformation of the peripheral edge of the coating end surface portion. A second portion of the adhesive remaining in the first hole is cured to secure the single-core fiber in the ferrule.

In accordance with yet a further aspect of the invention, the adhesive portion is disposed in the second hole. The single-core fiber is secured in the ferrule by an adhesive introduced in the second hole of the ferrule. A first portion of the adhesive in the second hole is displaced by the adhesive portion. A second portion of the adhesive remaining in the second hole is cured to secure the single-core fiber in the ferrule.

In accordance with another embodiment, a peripheral edge of the pipe end surface portion is deformed until the pipe end surface portion touches inner surfaces of the second hole when the single-core-fiber is inserted in the ferrule. The single-core fiber is secured in the ferrule includes by introduction of an adhesive in the second hole of the ferrule. A first portion of the adhesive is displaced from the second hole by the adhesive portion and the deformation of the peripheral edge of the coating end surface portion. The second portion of the adhesive remaining in the second hole is cured to secure the single-core fiber in the ferrule.

The above and other aspects of the present invention will become apparent upon consideration of the following detailed description of exemplary embodiments thereof, particularly when taken in conjunction with the accompanying drawings wherein like reference numerals in the various figures are utilized to designate like components.

BRIEF DESCRIPTION OF THE DRAWINGS

The above and other aspects of the invention will be made more apparent by describing in detail exemplary embodiments thereof with reference to the attached drawings in which:

FIGS. 1A and 1B are explanatory views for explaining a method of producing a ferrule with an optical fiber according to the present invention, wherein FIG. 1A is a fragmentary view illustrating a main portion of a coated optical fiber in which an adhesive portion is formed by means of adhesive cured on an end of a reinforcing pipe, and wherein

FIGS. 3A and 3B are views illustrating a first practical example of the ferrule with the optical fiber, wherein FIG. 3A is a longitudinal cross sectional view illustrating the ferrule with the optical fiber and wherein

FIGS. 4A and 4B are views illustrating a second practical example of the ferrule with the optical fiber, wherein FIG. 4A is a longitudinal cross sectional view illustrating the ferrule with the optical fiber and wherein

FIGS. 8A and 8B are partially longitudinal cross sectional views for explaining problems which arise during the insertion of an optical fiber in a conventional ferrule, wherein FIG. 8A is a view illustrating an appearance of an optical fiber inserted and wherein

DETAILED DESCRIPTION OF EXEMPLARY EMBODIMENTS OF THE INVENTION

With reference to the attached figures, exemplary embodiments of the present invention will now be described below. The described exemplary embodiments are intended to assist the understanding of the invention, and are not intended to limit the scope of the invention in any way.

Figure 1A:
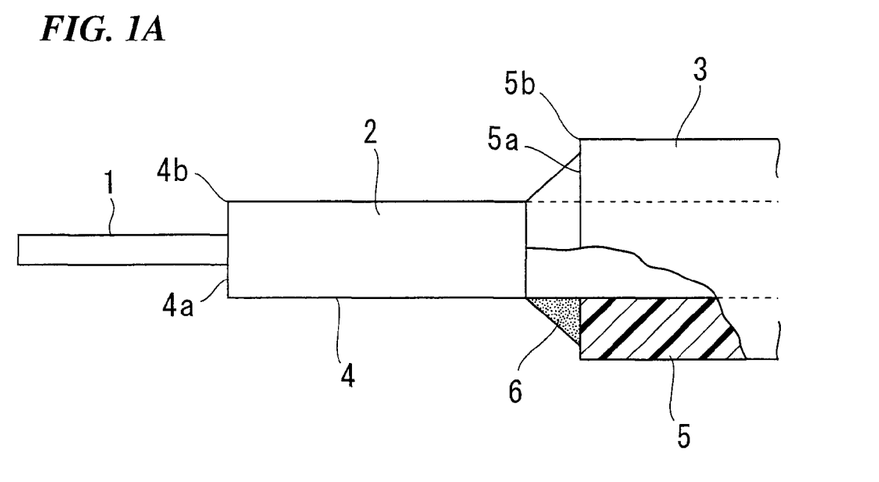
Figure 1B:
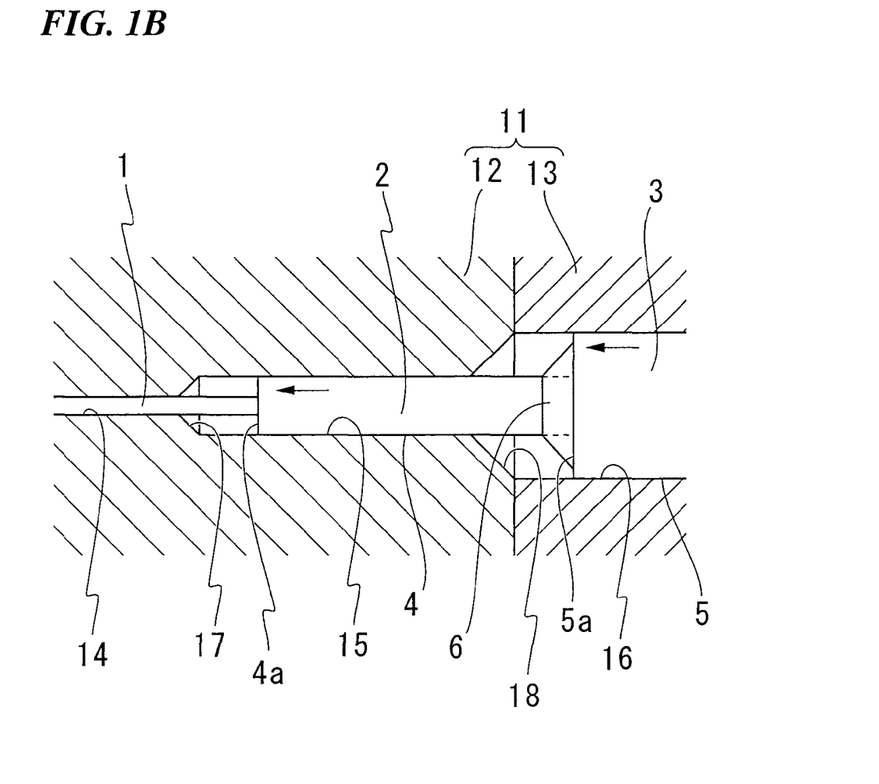
FIG. 1B is a view illustrating an appearance of a bare optical fiber inserted as shown in FIG. 1A.
Figure 2:
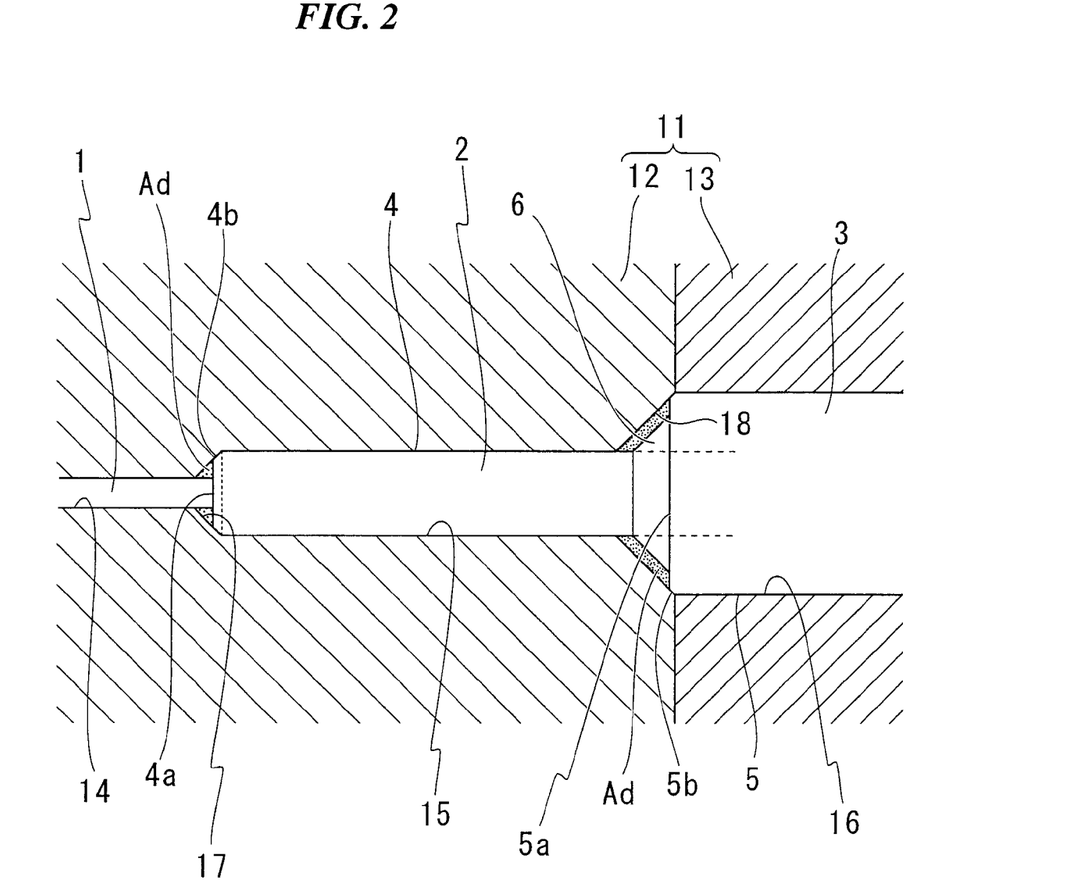
FIG. 2 is a longitudinal sectional view illustrating a main portion of the ferrule with the optical fiber.

FIGS. 1A and 1B are views for explaining a method of producing a ferrule with an optical fiber according to the present invention. FIG. 1A is a fragmentary view showing a main portion of a coated optical fiber in which an adhesive portion is previously formed on an end of a reinforcing pipe by means of adhesive being cured. FIG. 1B is a longitudinal sectional view showing an appearance of the ferrule into which the coated optical fiber shown in FIG. 1A is inserted. FIG. 2 is a longitudinal sectional view showing a main portion of the ferrule with the optical fiber. Incidentally, in FIG. 1B, the adhesive portion for bonding an inner surface of a hole of the ferrule and a coated optical fiber is not illustrated.

Figure 3A:
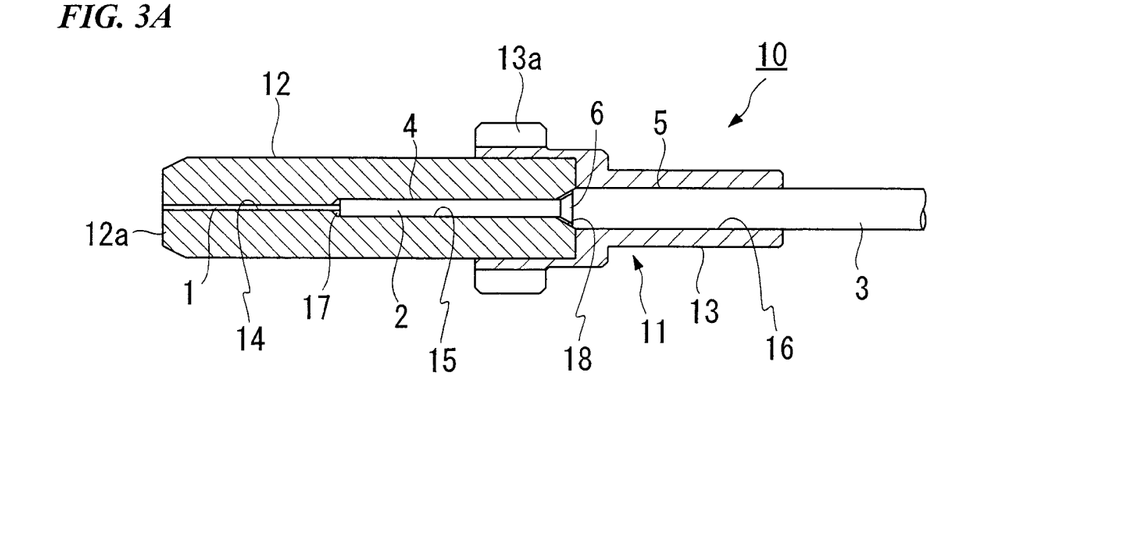
Figure 4A:
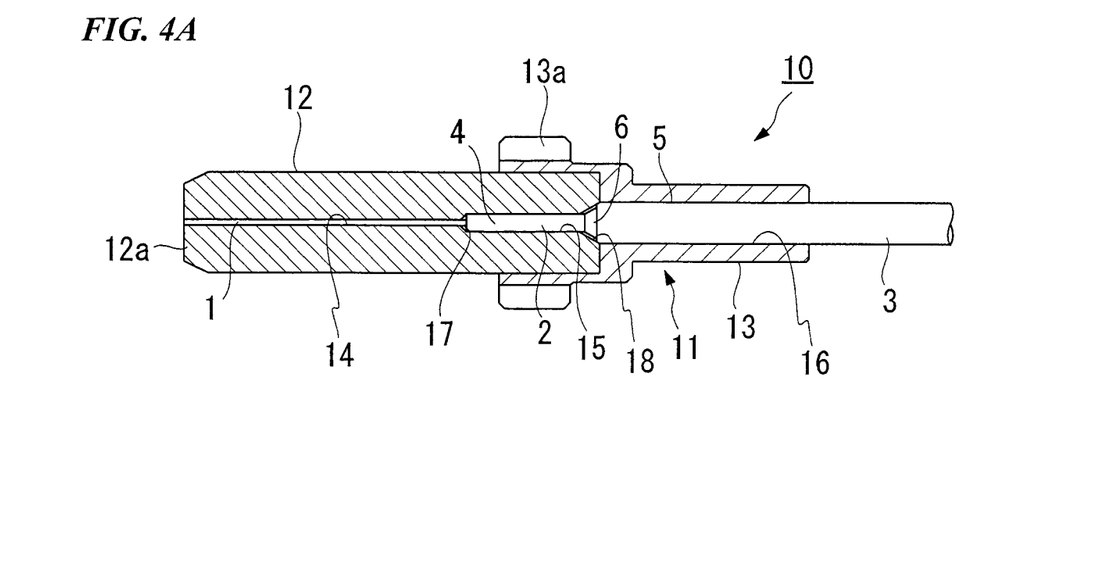

Ferrules with optical fibers which are produced in accordance with the present invention may include a ferrule with an optical fiber such as a ferrule with an optical fiber 10 in which the ferrule 11 is mounted on a leading end of the coated optical fiber 3 as show in FIGS. 3A and 4A.

As show in FIG. 1A, the coated optical fiber 3 of the present invention is provided with a single-core fiber 2 composed of a bare optical fiber 1 and of a primary coating 4 that covers an outer circumference of the bare optical fiber 1 and with a reinforcing pipe 5 which is fitted on an outer periphery of the single-core fiber 2. The type of optical fiber is not limited to this. Various types of optical fibers such as for example, a silica-based single-mode optical fiber, a polarization-maintaining optical fiber (PANDA fiber etc.) in which stress-applying parts are provided within a cladding at opposing sides with respect to a core, a fiber with deformation applied, and the like can be employed. The diameter of the bare optical fiber 1 may be about 125 μm or about 80 μm. However, it is not limited as such. An ultraviolet curable resin or the like can be employed as a resin for forming the primary coating 4. Further, a polyamide resin, a polyester resin, etc. can be employed as a resin for forming the reinforcing pipe 5.

Figure 3B:
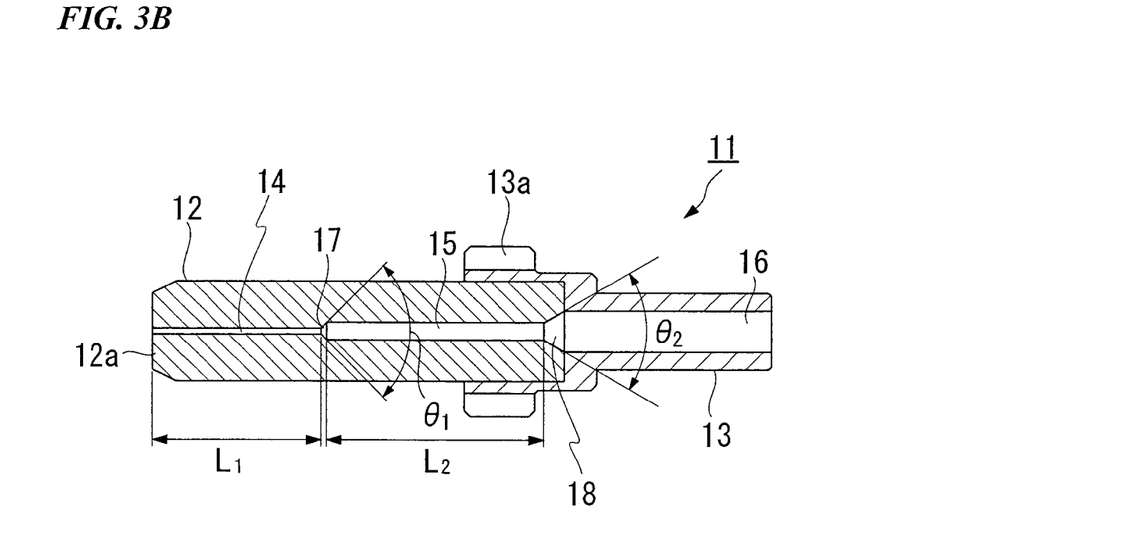
FIG. 3B is a longitudinal cross sectional view illustrating the ferrule only.
Figure 4B:
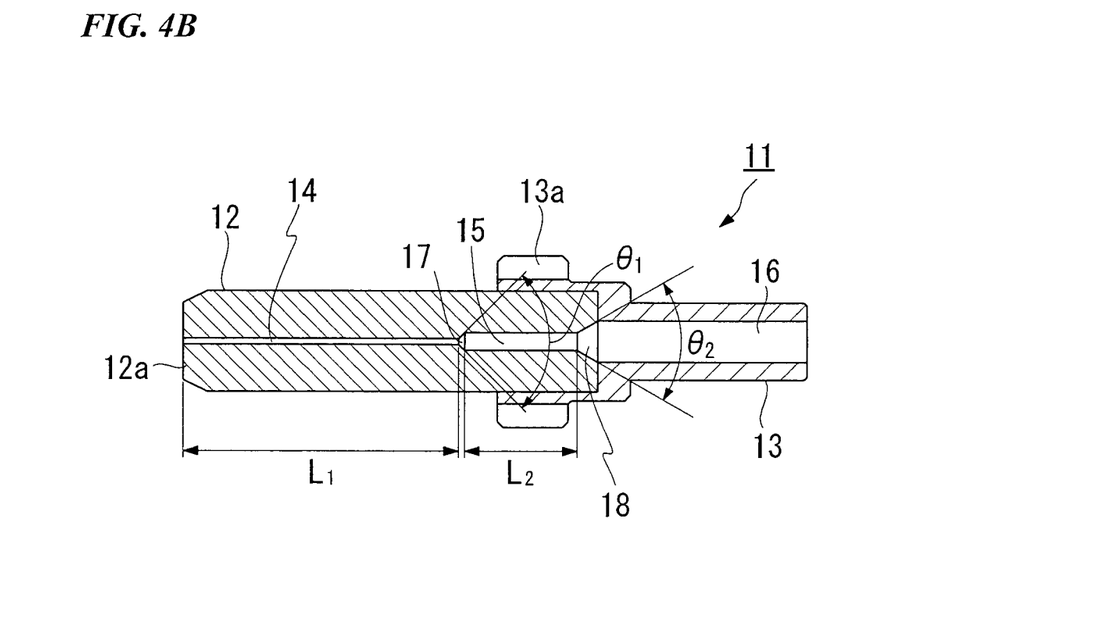
FIG. 4B is a longitudinal cross sectional view illustrating the ferrule only.

As shown in FIGS. 3B and 4B, the ferrule 11 is a combination of a ferrule body 13 provided with outwardly protruding flanges 13a formed one at each side thereof and of a generally-cylindrical shaped capillary 12 which is fixedly secured to a front end side of the ferrule body 13. In the ferrule body 13A is formed a coated-fiber-insertion hole 16 into which the coated optical fiber 3 is inserted or received. The ferrule body 13 can be formed of zirconia (Zr), stainless steel (SUS), synthetic resin, or the like.

The capillary 12 is provided with a connection-end face 12a which is formed at a front end side of the ferrule 11, with an optical-fiber-insertion hole 14 which is in the connection-end face and into which a bare optical fiber 1 is inserted and held in place, and with a single-core-fiber-insertion hole 15 which communicates with the optical-fiber-insertion hole 14 at a rear end side opposed to the connection-end face 12a of the optical-fiber-insertion hole 14 and into which a single-core fiber 2 is inserted and held in place.

The capillary 12 can be formed of ceramic such as, e.g., zirconia (Zr), or of glass such as amorphous glass, crystallized glass or the like. The external diameter of the capillary 12 can be about 2.5 mm applicable to a SC (Single Fiber Coupling) type optical connector recommended in JIS C 5973 etc. or about 1.25 mm applicable to a MU (Miniature-Unit) type optical connector recommended in JIS C 5983, etc. There are no limitations on the diameter thereof. It is preferable that the difference between an inner diameter of the optical-fiber-insertion hole 14 and an outer diameter of the bare optical fiber 1 be made small (e.g., about 0.001 mm) to such an extent that easy positioning of the bare optical fiber 1 can be assured.

As shown in FIG. 2, an end portion 4a of the primary coating 4 of the single-core fiber 2 abuts a first tapered hole 17 which is disposed between the optical-fiber-insertion hole 14 and the single-core-fiber-insertion hole 15. Because the end portion 4a of the primary coating 4 abuts an inner surface of the first tapered hole 17, the amount (or volume) of adhesive Ad present in a gap between the end portion 4a of the primary coating 4 and the inner surface of the first tapered hole 17 is reduced, thus lessening internal stress within the adhesive. As a result, adverse effects on the optical fiber can further be reduced. The taper angle $\theta 1$ of the inner surface of the first tapered hole 17 is preferably in the range of 30 degrees to 165 degrees. As a typical example, it is around 90 degrees. The larger the taper angle, the more the fiber positioning through abutment is eased and the amount (or volume) of adhesive Ad present within the first tapered hole 17 is reduced. Thus, internal stress within the adhesive is lessened. As a result, fortunately, adverse effects on the optical fiber can effectively be reduced. In the case where the taper angle $\theta 1$ is less than 30 degrees, there is a possibility of causing problems in that the optical fiber tends to bend along the inner (tapered) surface when the end portion 4a of the primary coating 4 abuts the inner surface of the first tapered hole 17, and in that the amount of the adhesive becomes large, thus resulting in more adversely effects due to greater contraction of the adhesive. As such, this is not preferable.

As shown in FIG. 2, an end portion 5a of the reinforcing pipe abuts a second tapered hole 18 which is disposed between the single-core-fiber-insertion hole 15 and the coated-fiber-insertion hole 16. Because the end portion 5a of the reinforcing pipe 5 abuts an inner surface of the second tapered hole 18, the amount (or volume) of adhesive Ad present in a gap between the end portion 5a of the reinforcing pipe 5 and the inner surface of the second tapered hole 18 is reduced, thus lessening internal stress within the adhesive. As a result, adverse effects on the optical fiber can further be reduced.

The taper angle $\theta 2$ of the inner surface of the first tapered hole 17 is preferably in the range of 60 degrees to 90 degrees. As a typical example, it is around 60 degrees.

As to the ratio between the length of the optical-fiber-insertion hole 14 formed in the capillary 12 and the length of the single-core-fiber-insertion hole 15 formed in the capillary 12, various values thereof are permissible. Namely, various configurations, such as one where the length L1 of the optical-fiber-insertion hole 14 is longer than the length L2 of the single-core-fiber-insertion hole 15 as shown in FIGS. 3A and 3B, another one where the length L2 of the single-core-fiber-insertion hole 15 is longer than the length L1 of the optical-fiber-insertion hole 14 as shown in FIGS. 4A and 4B, and a further one where, although not shown in a figure, the length L2 of the single-core-fiber-insertion hole 15 is nearly equal to the length L1 of the optical-fiber-insertion hole 14, are acceptable.

The difference between the inside diameter of the single-core-fiber-insertion hole 15 and the outside diameter of the single-core fiber 2 (or of the primary coating 4) is preferably approximately 0.1 mm. Therefore, for example, if the outside diameter of the single-core fiber 2 is 0.4 mm, the inside diameter of the single-core-fiber-insertion hole 15 is set to be around 0.5 mm. In a case where the difference between the inside diameter of the single-core-fiber-insertion hole 15 and the outside diameter of the single-core fiber 2 is large, it is possible to compensate for such a diameter difference by means of a non-illustrated protective tube made of synthetic resin, elastomer or the like, to be fitted on the primary coating 4. As can be seen from the foregoing, in the present invention, a single-core fiber simply represents an optical one which has an outside diameter between a bare optical fiber and a coated optical fiber. It may represent a single-core fiber in which a primary coating is provided on a bare optical fiber, in the real sense of the term. In addition thereto, it may represent a single-core fiber where a protective tube or the like is fitted on a primary coating. From the standpoint of easy positioning, the length L2 of the single-core-fiber insertion hole 15 is preferably 2 mm or more, and more preferably, in a range from 2 mm to 5 mm.

The difference between the inside diameter of the coated-fiber-insertion hole 16 and the outside diameter of the coated optical fiber 3 is preferably approximately 0.1 mm. Therefore, if the outside diameter of the coated optical fiber 3 (of the reinforcing pipe 5) is approximately 0.9 mm, it is preferable that the inside diameter of the coated-fiber-insertion hole 16 be set to around 1.0 mm. Therefore, a centerline of the coated optical fiber 3 is not easily shifted relative to a centerline of the coated-fiber-insertion hole 16. It is thus possible to limit bending, centerline deviation of the coated optical fiber 3, and the like.

As shown in FIG. 1A, an inner surface of the reinforcing pipe 5 is glued to an outer peripheral surface of the single-core fiber 2 by adhesive. If diameter of the optical fiber is within a range from 0.17 mm to 20 mm, the inside diameter of the reinforcing pipe 5 is approximately 0.21 mm (the outside diameter of the reinforcing pipe 5 is for example 0.9 mm). With this structure, when inserting an optical fiber or when external forces such as vibrations are exerted on the optical fiber, it is possible to limit bending of and internal pressure upon the single-core fiber 2 within the reinforcing pipe 5.

The adhesive by which the inner surface of the reinforcing pipe 5 is glued to the outer peripheral surface of the single-core fiber 2 forms an adhesive portion 6 which protrudes and tapers from an end surface portion 5a of the reinforcing pipe 5 toward a front end side of the single-core fiber 2. This adhesive portion 6 leaves exposed (uncovers) a peripheral edge region (or ring region) 5b of the end surface portion 5a of the reinforcing pipe 5 and has a tapered shape so as to protrude toward the front end side of the single-core fiber 2.

Next, with reference to FIGS. 1A, 1B, and 2, a producing method of the ferrule with the optical fiber 10 according to the present invention will be explained.

Firstly, the single-core fiber 2 is inserted in the reinforcing pipe 5 which has previously been cut to a predetermined length. Then, by means of adhesive, the inner surface of the reinforcing pipe 5 and the outer peripheral surface of the single-core fiber 2 are glued. Thereat, as shown in FIG. 1A, a leading end portion of the single-core fiber 2 is exposed from an end portion of the reinforcing pipe 5, and then, the adhesive portion 6 is cured and formed so as to protrude and taper from the end surface portion 5a of the reinforcing pipe 5 toward the front end side of the single-core fiber 2. The adhesive portion 6 cured and formed in a tapered shape preferably has a taper angle which is nearly equal to the taper angle θ2 of the second tapered hole 18. The adhesive portion 6 may be smaller in size than the second tapered hole 18. There is no need for both of them to be made in the same shape.

Next, the primary coating 4 is stripped off from a front end portion of the single-core fiber 2 such that a portion of the bare optical fiber 1 is exposed. The length between the exposed portion of the bare optical fiber 1 and the end surface portion 5a of the reinforcing pipe 5, i.e., the length of an exposed portion of the primary coating 4 of the single-core fiber 2 is set to be nearly equal to the length L2 of the single-core-fiber-insertion hole 15. This can easily be done by controlling a position of an area of the primary coating to be stripped off.

Incidentally, another procedure is adoptable in which the primary coating 4 is stripped off from the front end portion of the single-core fiber 2 such that a portion of the bare optical fiber 1 is exposed, and thereafter, the single-core fiber 2 is inserted in the reinforcing pipe 5. In this case, by shifting along the single-core fiber 2 a position of the reinforcing pipe 5 with respect to the end surface portion 4a of the primary coating 4, it is possible to control an exposure length of the primary coating 4.

The length of the portion of the bare optical fiber 1 exposed is set to be nearly equal to or greater than the length L1 of the optical-fiber-insertion hole 14. In the case in which the bare optical fiber 1 portion is long so that the front end thereof protrudes from the optical-fiber-insertion hole 14, control of appropriate positioning of an end surface of the bare optical fiber 1 with respect to the connection-end face 12a can be done by cutting, polishing and the like subsequent to an assembly operation. Therefore, when stripping off the primary coating 4, the bare optical fiber 1 can be exposed so that the length thereof is sufficiently longer than the length of the optical-fiber-insertion hole 14.

Further, as shown in FIG. 1B, the coated optical fiber 3 with the adhesive portion 6, which has been previously cured in the tapered shape as described above, is inserted in the ferrule 11 such that the end surface portion 4a of the primary coating 4 of the single-core fiber 2 abuts against the first tapered hole 17 and, at the same time, the end surface portion 5a of the reinforcing pipe 5 abuts against the second tapered hole 18. Finally, the bare optical fiber 1 is housed in the optical-fiber-insertion hole 14 and the single-core fiber 2 is housed in the single-core-fiber-insertion hole 15.

As described above, in the present embodiment, in order to form the adhesive portion 6, the exposed portion of the primary coating 4 is provided between the bare optical fiber 1 and the coated optical fiber 3. The end surface portion 4a of the primary coating 4 and the end surface portion 5a of the reinforcing pipe 5 abut against the first and second tapered holes 17, 18, respectively. Therefore, the exposed portion of the single-core fiber 2 (or of the primary coating 4) can be kept straight due to abutting forces against the first and the second tapered hole 17, 18. Namely, because the portions against which the end surface portions 4a and 5a abut have been made to be tapered holes, the end surface portions 4a and 5a receive at circumferences thereof pressing forces, which are caused by reaction from inner surfaces of the tapered holes and which are radially inwardly directed.

Then, as shown in FIG. 2, peripheral edges 4b and 5b of the end surface portion 4a of the primary coating 4 and of the end surface portion 5a of the reinforcing pipe 5 are deformed inwards. In other words, the reinforcing pipe can further advance from a position in which the end surface portions 4a and 5a firstly touch inner surfaces of the tapered hole 17 and 18 to a deeper position (a connection-end face side, i.e., left hand side in FIG. 2). Further, when the peripheral edges 4b and 5b of the end surface portions 4a and 5a have been inwardly deformed or squeezed, the peripheral edges 4b and 5b of the end surface portions 4a and 5a closely touch the inner surfaces of the tapered holes 17 and 18 due to the elastic force of the synthetic resin material which forms the primary coating 4 and the reinforcing pipe 5. The single-core fiber 2 can be supported in a radially equalized manner such that a center axis of the single-core fiber 2 coincides with a center axis of the single-core-fiber-insertion hole 15. Furthermore, because both of the first tapered hole 17 and the second tapered hole 18 are formed in the capillary 12, even if there is a positional deviation between the capillary 12 and the ferrule body 13, the positional relationship between the first and the second tapered holes 17, 18 is maintained unchanged, and therefore, such positional deviation cannot adversely affect the positioning of the single-core fiber 2.

As described above, the center axis of the single-core fiber 2 does not deviate from the center axis of the single-core-fiber-insertion hole 15, and therefore, it is possible to secure the single-core fiber 2 in place between the first tapered hole 17 and the second tapered hole 18 while maintaining the single-core fiber 2 in a straight line. As a result, adverse effects with respect to the bare optical fiber 1 in the optical-fiber-insertion hole 14 can effectively be eliminated. Further, the single-core-fiber-insertion hole 15 is provided between the optical-fiber-insertion hole 14 and the coated-fiber-insertion hole 16 such that they are substantially separated. With this structure, deflections of the coated optical fiber 3 and the reinforcing pipe 5 and stress induced therein have little adverse effect on the bare optical fiber 1 in coated-fiber-insertion hole 16. Furthermore, a thickness of an adhesive in a cylindrical gap between an inner surface of the single-core-fiber-insertion hole 15 and an outer surface of the single-core fiber 2 is circumferentially equalized. Therefore, even when cure and shrinkage of the adhesive occurs due to changes in temperature, it is possible to eliminate factors which would adverse consequences to optical transmission, such as internal stress and bending deformation of the optical fiber in the single-core fiber 2 and of the bare optical fiber 1 in the optical-fiber-insertion hole 14, and to securely and properly maintain optical properties.

As shown in FIG. 2, the optical fiber is secured in the ferrule 11 by means of the adhesive Ad. The adhesive Ad for bonding the optical fiber with the ferrule can be applied on a periphery of the optical fiber prior to inserting the optical fiber in the ferrule. Another operation is possible in which the adhesive is first applied or provided in the ferrule, and thereafter, the optical fiber is inserted therein.

In accordance with the present invention, the adhesive by which the single-core fiber 2 and the reinforcing pipe 5 are glued together forms the adhesive portion 6 which is cured so as to protrude and taper from the end surface portion 5a of the reinforcing pipe 5 toward the front end side of the single-core fiber 2. The end surface portion 5a is moved to abut against the second tapered hole 18 such that a volume of a space enclosed with the inner surface of the second tapered hole 18, with the end surface portion 5a of the reinforcing pipe 5, and with the adhesive portion 6 is reduced in such a manner that the adhesive portion 6 displaces part of the adhesive Ad present in this enclosed space. As a result, a volume of the adhesive Ad filled in this space can be made small. Therefore, even when curing and shrinkage of the adhesive Ad in the enclosed space occurs due to changes in temperature, internal stress induced in the adhesive can be reduced, and therefore, adverse consequences to the optical fiber can be prevented. The adhesive portion 6 can be easily and simply formed around the primary coating 4. The adhesive portion 6 formed in a protruding manner does not involve any adverse effects on the bare optical fiber 1. Further, it is easy to control the shape of the adhesive portion 6 before or after the adhesive is cured.

Moreover, by simply pressing the peripheral edge region 5b of the end surface portion 5a of the reinforcing pipe 5 against the inner surface of the second tapered hole 18, a predetermined gap can be securely formed between the outer surface of the adhesive portion 6 and the inner surface of the second tapered hole 18. Therefore, when the ferrule 11 and the coated optical fiber 3 are glued together, the flow of adhesive Ad is not inhibited.

Still further, the end surface portion 4a of the primary coating 4 is moved to abut against the inner surface of the first tapered hole 17 such that an amount (volume) of the adhesive Ad in the first tapered hole 17 is reduced. Therefore, internal stresses induced in the adhesive can be reduced. As a result, adverse effects on the optical fiber can be further limited.

In addition, the second tapered hole 18 is separated in a lengthwise direction of the optical fiber, from the bare optical fiber 1 inserted in the optical-fiber-insertion hole 14. The single-core fiber 2 can be positioned and fixed by means of the single-core-fiber-insertion hole 15 which is provided between the optical-fiber-insertion hole 14 and the coated-fiber-insertion hole 16. Therefore, bending deformation of the coated optical fiber 3 and internal stress in the reinforcing pipe 5 do not substantially affect the bare optical fiber 1 received in the optical-fiber-insertion hole 14.

As compared with the conventional examples shown in FIGS. 5 and 6, in the present invention, the single-core-fiber-insertion hole 15 is provided between the optical-fiber-insertion hole 14 and the coated-fiber-insertion hole 16, and has a diameter intermediate between the diameters of the holes 14 and 16. As compared to the shrinkage ratio of the tapered hole 115 of the above conventional examples, the shrinkage ratio of the first tapered hole 17 positioned between the optical-fiber-insertion hole 14 and the single-core-fiber-insertion hole 15 is small. As a result, stress is not concentrated at the end of the single-core fiber 2 (the exposed portion side of the bare optical fiber 1). Adverse effects exerted by bubbles and shrinkage of the adhesive are also small. Deterioration of characteristics can be reduced. A high performance ferrule with the fiber can be produced or assembled.

As a single-core fiber (2), a silica-based optical fiber is used, in which the outer diameter (cladding diameter) of the bare optical fiber (1) is about 0.125 mm and the outer diameter of the primary coating (4) is about 0.25 mm. A reinforcing pipe (5) whose inner diameter is 0.4 mm or so and whose outer diameter is 0.9 mm or so is fitted on the single-core fiber (2) and fixed thereto by an adhesive to thereby form a coated optical fiber (3). At this time, part of the adhesive is made to protrude from the end surface portion 5a of the reinforcing pipe 5 toward the front end side of the single-core fiber 2 and thereafter cured so as to form a tapered adhesive portion 6 around the single-core fiber 2 (see FIG. 1A).

In this embodiment, a ferrule 11 is used which has specifications in which the taper angle θ1 of the first tapered hole 17 is approximately 90°, the taper angle θ2 of the second tapered hole 18 is approximately 60°, the inner diameter of the optical-fiber-insertion hole 14 is approximately 0.126 mm, the inner diameter of the single-core-fiber-insertion hole 15 is approximately 0.3 mm, and the inner diameter of the coated-fiber-insertion hole 16 is approximately 1.0 mm. As such, the gap between the primary coating 4 and the single-core-fiber-insertion hole 15 (i.e., the difference between the inner diameter and the outer diameter) is approximately 0.1 mm and the gap between the reinforcing pipe 5 and the coated-fiber-insertion hole 16 (i.e., the difference between the inner diameter and the outer diameter) is approximately 0.1 mm.

The adhesive portion 6 formed of the adhesive by which the single-core fiber 2 and the reinforcing pipe 5 are glued together is provided on the coated optical fiber 3 (the reinforcing pipe 5). The coated optical fiber 3 is applied with uncured adhesive, and thereafter, it is inserted in the above-mentioned ferrule 11 until the end surface portion 4a of the primary coating 4 abuts against the first tapered hole 17 and until the end surface portion 5a of the reinforcing pipe 5 abuts against the second tapered hole 18. Then, the adhesive Ad for gluing the coated optical fiber 3 and the ferrule 11 is cured such that a ferrule with an optical fiber 10 is formed and produced.

In connection with the thus produced ferrule with the optical fiber 10, the extinction ratio was measured. The extinction ratio has been improved to such an extent that it reaches to the level of 35 to 42 dB. In contrast, as shown in FIGS. 5 and 6, in an evaluation of a ferrule with an optical fiber 110 structured by a ferrule in which an optical-fiber-insertion hole 114 and a coated-fiber-insertion hole 116 are caused to communicate with one another via a tapered hole 115 only, the extinction ratio reaches only to the level of 25 dB. In accordance with the present invention, it is possible to remove adverse affects exerted by shrinkage of the adhesive, bubbles in the adhesive and the like, and to control worsening of optical properties.

Incidentally, the adhesive for forming an adhesive portion 6 and the adhesive for fixedly securing the coated optical fiber may be the same or different.

The present invention is applicable to optical connection of optical fibers in various fields such as optical communications and optical measurement using optical fibers.

While the invention has been specifically shown and described with reference to exemplary embodiments thereof, the invention is not to be considered as being limited by the foregoing description. It is apparent that various changes in form and details may be made by those of ordinary skill in the art while referring to the present specification. Therefore, such modifications can be made without departing from the spirit and scope of the invention as defined by the following claims.

What is claimed is:

1. A method of producing a ferrule with an optical fiber, the method comprising:
    forming an adhesive portion by adhering a reinforcing pipe to a single-core fiber and by exposing a peripheral edge of a pipe end surface portion of the reinforcing pipe such that the adhesive portion protrudes and tapers from the pipe end surface portion toward a front end of the single-core fiber, the single-core fiber including an optical fiber and a coating;
    stripping the coating from the front end of the single-core fiber to provide an exposed portion of the optical fiber without the coating and a coated portion of the optical fiber that is covered by the coating, the coated optical fiber portion exposing a peripheral edge of a coating end surface portion;

a first abutting step of inserting the single-core fiber to which the reinforcing pipe is adhered in a ferrule having a capillary provided with a first tapered hole and a second tapered hole, and abutting the coating end surface portion against the first tapered hole;

a second abutting step of inserting the single-core fiber to which the reinforcing pipe is adhered in the ferrule having the capillary provided with the first tapered hole and the second tapered hole, and abutting the pipe end surface portion from which the adhesive portion protrudes and tapers against the second tapered hole; and securing the single-core fiber to which the reinforcing pipe is adhered in the ferrule, wherein the first abutting step and the second abutting step are performed at the same time.

2. The method according to claim 1, wherein adhering the reinforcing pipe includes:

inserting the single-core fiber in the reinforcing pipe;

gluing the single-core fiber and the reinforcing pipe using an adhesive;

exposing the front end of the single-core fiber from the pipe end surface portion; and curing and forming the adhesive to form the adhesive portion.

3. The method according to claim 2, wherein curing and forming the adhesive includes curing and forming the adhesive to form the adhesive portion that includes a taper angle about a taper angle of the second hole.

4. The method according to claim 1, wherein stripping the coating from the front end of the single-core fiber is performed before or after adhering the reinforcing pipe to the single-core fiber.

5. The method according to claim 1, wherein inserting the single-core fiber to which the reinforcing pipe is adhered in a ferrule further includes deforming the peripheral edge of the coating end surface portion until the coating end surface portion touches inner surfaces of the first hole.

6. The method according to claim 5, wherein securing the single-core fiber in the ferrule includes:

introducing an adhesive in the first hole of the ferrule;

displacing a first portion of the adhesive from the first hole by the deforming of the peripheral edge of the coating end surface portion; and curing a second portion of the adhesive remaining in the first hole to secure the single-core fiber in the ferrule.

7. The method according to claim 1, wherein inserting the single-core fiber to which the reinforcing pipe is adhered in a ferrule further includes disposing the adhesive portion in the second hole.

8. The method according to claim 7, wherein securing the single-core fiber in the ferrule includes:

introducing an adhesive in the second hole of the ferrule;

displacing a first portion of the adhesive in the second hole by the disposing of the adhesive portion in the second hole; and curing a second portion of the adhesive remaining in the second hole to secure the single-core fiber in the ferrule.

9. The method according to claim 7, wherein inserting the single-core fiber to which the reinforcing pipe is adhered in a ferrule further includes deforming the peripheral edge of the pipe end surface portion until the pipe end surface portion touches inner surfaces of the second hole.

10. The method according to claim 9, wherein securing the single-core fiber in the ferrule includes:

introducing an adhesive in the second hole of the ferrule;

displacing a first portion of the adhesive from the second hole by the disposing of the adhesive portion in the second hole and the deforming of the peripheral edge of the coating end surface portion; and curing a second portion of the adhesive remaining in the second hole to secure the single-core fiber in the ferrule.

11. The method according to claim 1, wherein inserting the single-core fiber to which the reinforcing pipe is adhered in a ferrule includes:

abutting the coating end surface portion against the first tapered hole together with abutting the pipe end surface portion against the second tapered hole.

12. The method according to claim 1, wherein inserting the single-core fiber to which the reinforcing pipe is adhered in a ferrule includes:

deforming the peripheral edge of the coating end surface portion inward from a press of the first tapered hole; and deforming the peripheral edge of the reinforcing pipe inward from a press of the second tapered hole.

13. The method according to claim 1, wherein the first tapered hole has a first taper angle in a range of 30 to 165 degrees.

14. The method according to claim 1, wherein the second tapered hole has a second taper angle in a range of 60 to 90 degrees.

15. The method according to claim 1, wherein:

the first tapered hole has a first taper angle in a range of 30 to 165 degrees; and the second tapered hole has a second taper angle in a range of 60 to 90 degrees.

16. The method according to claim 1, wherein a length from the coating end surface portion to the pipe end surface portion is substantially equal to a length from the first tapered hole to the second tapered hole so as to perform the first abutting step and the second abutting step at the same time.

* * * * *